July 19, 1966  G. A. HENDERSON  3,261,384
CIRCULAR SAW
Filed May 19, 1965
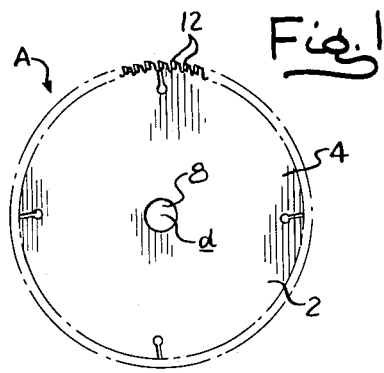
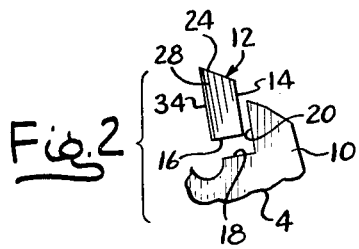
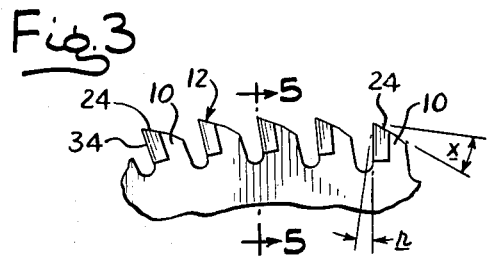
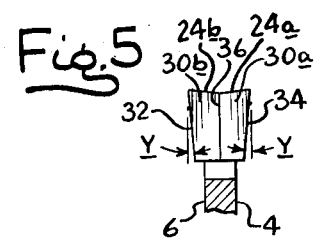
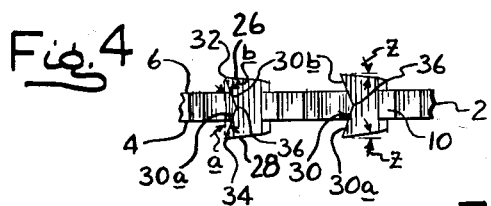
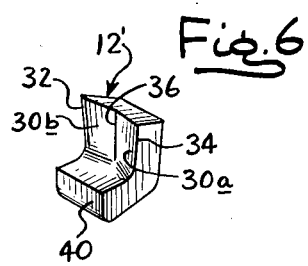
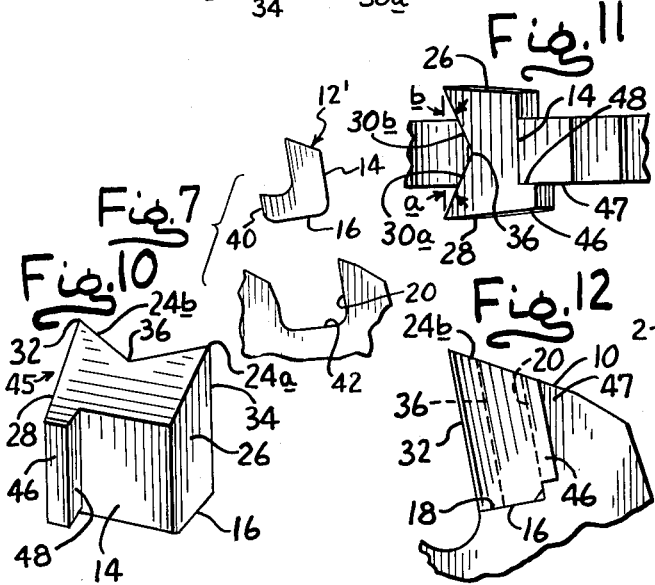
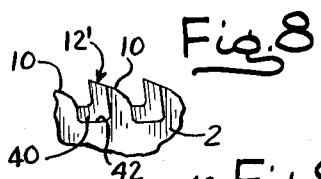
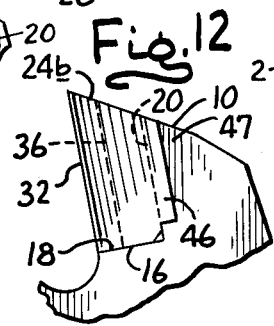
INVENTOR.
GEORGE A. HENDERSON
BY Morris Spector
ATTY.

3,261,384
CIRCULAR SAW
George A. Henderson, 1807 N. California Ave., Chicago, Ill.
Filed May 19, 1965, Ser. No. 457,120
5 Claims. (Cl. 143—133)

This application is a continuation-in-part of my co-pending application, Serial No. 259,805, filed February 20, 1963, now abandoned.

This invention relates to improvements in circular saws, particularly those of the carbide tipped type.

In circular saws of the carbide tipped type used for sawing various materials such as gypsum board, wood, tile, and the like, it is a common practice to make the corresponding cutting edges of all of the teeth face in the same direction. The teeth each have a lateral cutting edge on only one side of the saw body and together with an acute shear face angle. The opposite lateral edges of the teeth, which are at the other side of the saw body, do not have cutting edges. The lateral cutting edges define one surface of revolution that is axially spaced from one side of the saw body while the other or non-cutting edges form another surface of the revolution, the two surfaces of revolution constituting the kerf of the saw. When the saw cuts during rotation thereof, the fact that the corresponding cutting edges of all of the teeth are oriented in the same direction creates lateral reaction forces tending to bend or flex the saw from its desired course.

Moreover, the shear face angles of all of the teeth in any given saw are presented to the same side of the saw (i.e. the cutting edge side) with the result that the saw makes a smooth cut at one side of the kerf and a rough cut at the other side thereof. If the rough cut side is on a piece of waste or trim, there is generally no objection to a rough cut being made, but if both pieces are to have a smooth cut, as for instance when both pieces are to be used, two sawing operations must be carried out, and some material must be wasted. It has been customary to utilize such saws in pairs, that is, a "right" and a "left" cut saw.

Saws of the foregoing type generally are formed with fillets between each tooth and its adjacent forward tooth backing element. When the saw is used to cut certain types of material that produce highly abrasive dust during the cutting operation, the dust is pulled into the fillets. This tends to abrade the saw body at those regions, thereby weakening the saw and shortening its useful life.

It is an object of the present invention to provide a circular saw in which the cutting edges of each tooth are presented in a manner to equalize the lateral forces on the saw during cutting. It is also an object of the present invention to provide a saw of the type stated in which each tooth has opposed cutting edges laterally of the saw body, and wherein there are dual shear face angles on each tooth, one with respect to each cutting edge. By reason of the foregoing construction, a smooth cut is made at each side of the kerf of the saw. Also the shear forces on the bonded interface between the tooth and saw body are equalized which tends to reduce the possibility of the tooth being sheared off of the saw.

It is a further object of the present invention to provide a saw of the type stated in which the number of teeth in the saw may be reduced in half over saws wherein alternate teeth have alternate cutting edges presented to one side of the saw, while at the same time maintaining comparable effectiveness and smoothness of cut.

It is an additional object of the present invention to provide a saw of the type stated in which the peripheral recess or fillet between each tooth and its adjacent forward backing element is covered by a part of the saw tooth, thereby to shield the filleted part of the saw body from abrasive dust. The saw teeth or tips are of a tungsten carbide material and are much better able to withstand the abrasive wear than is the softer steel of the saw body.

It is a further object of the present invention to provide a saw of the general type stated in which the tips may be readily centered with respect to the mid plane of the saw body during assembly therewith.

The attainment of the above and further objects of the present invention will be apparent from the following specification taken in conjunction with the accompanying drawing forming a part thereof.

In the drawing:

FIG. 1 is a side elevational view of a circular saw constructed in accordance with and embodying the present invention;

FIG. 2 is an exploded fragmentary side elevational view, on an enlarged scale, of a portion of the periphery of the saw of FIG. 1;

FIG. 3 is a fragmentary side elevational view, on an enlarged scale, of a portion of the saw of FIG. 1 and showing several teeth thereon;

FIG. 4 is a fragmentary top plan view, on an enlarged scale, of the part of the saw shown in FIG. 3;

FIG. 5 is a fragmentary sectional view taken along line 5—5 of FIG. 4;

FIG. 6 is a perspective view of a modified form of inserted saw tooth and forming part of the present invention;

FIG. 7 is an exploded side elevational view of the saw tooth of FIG. 6 and the peripheral part of the saw body to which the tooth is attached;

FIG. 8 is a fragmentary side elevational view showing several teeth, of the type shown in FIGS. 6 and 7, in mounted position on a saw body;

FIG. 9 is a fragmentary top plan view, on an enlarged scale, of the structure of FIG. 8;

FIG. 10 is a perspective view of a modified form of carbide tip that forms part of the present invention;

FIG. 11 is a fragmentary top plan view of a saw having carbide tips of the type shown in FIG. 10; and FIG. 12 is a fragmentary side elevational view of the saw of FIG. 11.

Referring now in more detail to the drawing in which like reference characters indicate like parts, A designates a circular saw which is particularly useful for sawing gypsum board, tile, and the like. The saw A comprises a tempered steel, balanced, flat disc-like saw body 2 having opposite parallel sides 4, 6 which are perpendicular to the axis of rotation $d$ of the saw body 2. Formed in the saw body 2 and surrounding the axis $d$ is a hole 8 by which the saw may be mounted on the saw arbor of the machine that drives the saw.

Integrally formed on the periphery of the saw body 2 and extending completely therearound are circumferentially spaced tooth-backing elements 10, and mounted on the tooth-backing elements 10 are tips or saw teeth 12. The tips or saw teeth 12 are identical and may be formed of a suitable tungsten carbide steel. Each tooth-backing element 10 is formed with a generally L-shaped seat having adjacent circumferential and outwardly extending shoulders 14, 16 which are shown as being surfaces that are perpendicular to the sides 4, 6. These surfaces 4, 6 are sized for flush-fitting reception of similarly shaped bottom and rear surfaces 18, 20 which are on the teeth 12. As is best apparent from FIGURES 2 and 3, the saw body has a gullet immediately forwardly of each surface 18. The teeth 12 may be secured to the tooth-backing elements 10 in any suitable manner, as for instance by brazing.

Formed on the teeth 12 are end surfaces 24 which are inclined to provide a top clearance angle X, and this clearance angle X may be of the order of 20 degrees. The teeth also have lateral faces 26, 28 which, as seen by the drawing, are entirely laterally outwardly, respectively, of the adjacent sides 4, 6 of the saw body 2. The lateral faces 26, 28 may be set at small vertical clearance angles Y, Y, which may be of the order of 3 to 5 degrees. Similarly, the lateral faces 26, 28 may diverge to provide small side clearance angles Z, which likewise may be of the order of 3 to 5 degrees.

The front face of each tooth 12 is contoured to provide cutting edges 32, 34 that are laterally of the disc sides 4, 6, and the cutting edges of all of the teeth form surfaces of revolution that define the kerf of the saw. The cutting edges are disposed to form a rake angle $r$. Furthermore, the front face of each tooth 12 forms dual, equal, acute shear face angles $a$, $b$, at each side of the tooth. Preferably, the shear angles $a$, $b$, are formed by planar front face sections 30$a$, 30$b$ that intersect at a line 36 that is in the mid-plane of the tooth and the saw body 2. For purposes of the present invention, acute shear face angles $a$, $b$, of about 20 degrees with respect to planes passing through the axis $d$ have been found satisfactory, leaving about 140 degrees included angle between the front face sections 30$a$, 30$b$.

By reason of the fact that each tooth 12 has a cutting edge 32, 34 at each side thereof, the cutting action of the teeth tend to set up equal and opposite lateral reaction forces on the saw body 2, and this construction assists in maintaining the saw planar and enables a greater accuracy of cut along a straight line. Furthermore, each cutting edge 32, 34, makes a shear cut due to the presence of the dual shear angles $a$, $b$, with the result that the cut edges of both of the two pieces that are formed by the cutting operation will be smooth and have a finished appearance. From FIG. 5 it will also be apparent that the surfaces 30$a$, 30$b$ intersect the end face 24 at edges 24$a$, 24$b$ which form a V edge at the end face 24 and thus provide equal and opposite dual shear angle thereat. This facilitates a smooth cut by the end face.

From the foregoing it will be apparent that shear forces on the teeth and parallel to the axis of rotation $d$ are imposed in opposite directions along the bonded interfaces 16, 18 and 14, 20. These forces tend to be equalized due to the equal and opposite shear face angles on the teeth. As a result, the teeth are not likely to be sheared from the backing elements during operation of the saw. It will also be apparent that the cutting edges 32, 34 may be sharpened by grinding the side faces 26, 28 without grinding the body 2.

It is also possible to provide a modified form of saw A'. In the saw A', each tooth 12' has a forwardly extending base 40 that is wider than the saw body 2 and in which the surface 16 seats on the fillet 42 that is formed in the saw body 2 between adjacent tooth-backing elements 10. The base 40 may also cover a portion of the rear side of the adjacent forward backing element 10.

Saws of the foregoing type tend to draw dust from the cutting operation into the space between the teeth, which causes wear at the fillets, particularly if the dust is highly abrasive. However, the base 40 protects the saw body at the region of the fillets since the tungsten carbide material has greater wear resistant properties than the material of the body 2. Moreover, when the teeth are worn, they may be easily replaced, whereas a saw body that has been excessively abraded at the fillets may be rendered useless.

A further modified form of saw of the invention is shown in FIGS. 10–12. There the carbide tips 45 are similar to the tips 12, previously described, except that one side (which may be either side) of the tip 45 has an integral rearwardly extending flange 46 which lies against one side face 47 of the tooth-backing element 10. The adjacent surface 48 of the flange 46 and the side face 47 may be brazed together as are the adjacent surfaces of the tip 45 and L-shaped seat on the backing element 10. The flange 46 facilitates approximate centering of the tip 45 on the backing element during assembly of the tip therewith. For this purpose the flange 46 may have such width that when it is placed against the side face 47 with the tip 45 seated on the backing element, the apex 36 of the V is approximately in the mid-plane of the saw body 2. Substantially the entire surface 48 of the flange 46 may be flush with the side face 47. However, to compensate for possible irregularities such as small lateral projections at the junction of the L-shaped seat and side face 47, the surface 48 may be at a small angle to the side face 47, for example about 3 to 5 degrees, or in other words, about parallel to the tip side face 28. In that case, the rear edge portion of the flange 46 will abut the side face 47 and the brazing solder will fill the small void between the remainder of two surfaces 47, 48.

While the presence of the flange 46 may impart strength to the bonded interfaces of the tip 45 and saw body because of the increased area of bond between the two, the flange 46 need not be relied upon to resist the lateral shear forces acting at the bonded L-shaped surfaces of the tip and backing element because of the equal and opposite shear face angles $a$ and $b$ on the tip 45 which, as previously pointed out, tend to equalize those shear forces.

It will be apparent from the foregoing that the tip 12' of FIGS. 6–9 could also be modified by provision thereon of a rearwardly projecting flange 46 of the type and for the purpose previously described.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A circular saw comprising a tempered flat disc-like saw body having opposite sides perpendicular to the axis of rotation of the body, circumferentially spaced tooth backing elements on the periphery of the saw body and projecting radially outwardly therefrom, each backing element having a generally L-shaped seat formed by circumferential and outwardly presented tooth-supporting surfaces, a carbide tooth having surfaces that define generally an L-shape and with said tooth abutting said surfaces on a backing element and with said abuting surfaces of the tooth and backing element being substantially perpendicular to said opposite sides of the saw body and being secured together by a bonding film interposed therebetween, the saw tooth having its entire opposite side faces lying laterally outwardly respectively of said opposite sides of said saw body, the saw tooth also having its front face presented toward the adjacent forward backing element, the front face having two surfaces that intersect respectively the side faces of the tooth to form cutting edges lying entirely axially outwardly of said opposite sides of the saw body and which cutting edges define opposed surfaces of revolution forming the kerf of the saw, said two surfaces forming a V that opens toward the adjacent forward backing element and with the included angle of the V being an obtuse angle and providing equal and opposite acute shear face angles at each side of each tooth which substantially equalize the oppositely directed forces parallel to said axis of rotation and which are imposed as shear forces on said bonding film during operation of the saw, one side only of each tooth having a rearwardly extending flange that abuts the adjacent side face of the associated backing element to constitute a means for locating the apex of said V substantially at the mid-plane of the saw body during assembly of the tooth therewith.

2. A circular saw comprising a tempered flat disc-like saw body having opposite sides, circumferentially spaced tooth backing elements on the periphery of the saw body and projecting radially outwardly therefrom, each backing element having a seat that includes circumferential and outwardly presented tooth-supporting surfaces, a carbide tooth having surfaces, abutting said surfaces on a backing element with said abutting surfaces of the tooth and backing element being secured together by a bonding film interposed therebetween, the saw tooth having the entire opposite side faces lying laterally outwardly respectively of said opposite sides of said saw body, means forming acute shear face angles at each side of the tooth, said means including two surfaces on the front face of the tooth that intersect respectively the side faces of the tooth to form cutting edges lying entirely axially outwardly of said opposite sides of the saw body and which cutting edges define opposed surfaces of revolution forming the kerf of the saw, said two surfaces forming a V that opens toward the adjacent forward backing element, one side only of each tooth having a rearwardly extending flange that abuts the adjacent side face of the associated backing element to constitute a means for locating the apex of the V substantially at the mid-plane of the saw body during assembly of the tooth therewith.

3. A saw comprising a circular saw body, and circumferentially spaced tooth backing elements on the periphery of the saw body and projecting radially outwardly therefrom, said saw body having an outwardly opening peripheral fillet between adjacent backing elements, a carbide saw tooth secured to each backing element, abutting surfaces of the backing element and tooth backing being generally L-shaped and parallel to the axis of rotation of said body, a bonding film at the L-shaped interface and resisting entirely any shear forces on the tooth parallel to said axis, each tooth having a part thereof covering substantially all of the outwardly presented surface of the adjacent forward fillet to increase the wear-resistant properties of the peripheral part of the saw between the teeth, each tooth having at opposite sides thereof cutting edges that form the kerf of the saw, each tooth also having a face presented toward the adjacent forward backing element and each face being of generally V-shaped contour with the V-opening toward the adjacent forward backing element, the V forming an included obtuse angle and intersecting the cutting edges and form opposite acute shear face angles at each side of the tooth.

4. A circular saw comprising a flat disc-like saw body having opposite sides perpendicular to the axis of rotation of the body, circumferentially spaced tooth backing elements on the periphery of the saw body and projecting radially outwardly therefrom, and a carbide tooth secured to each backing element, abutting surfaces of the backing element and tooth being generally L-shaped and parallel to said axis, a bonding film at the L-shaped interface and resisting entirely any shear forces on the tooth parallel to said axis, each saw tooth having its opposite side faces lying laterally outwardly respectively of said opposite sides of said saw body, each saw tooth also having a V-shaped front face presented toward the adjacent forward backing element, the V-shaped front face being formed by two surfaces that intersect respectively the side faces of the tooth to form cutting edges laterally outwardly of said opposite sides of the saw body and which cutting edges define opposed surfaces of revolution forming the kerf of the saw, said two surfaces lying substantially in planes that intersect substantially at the midplane of the tooth and form an included obtuse angle, the line of intersection of said surfaces lying circumferentially intermediate said cutting edges and the backing element of the tooth to form equal and opposite acute shear face angles at each side of each tooth which substantially equalize the oppositely directed forces axially of the teeth that are imposed along the bonded interface, the saw body also having a peripheral fillet between adjacent backing elements, a part of each tooth covering substantially all of the outwardly presented surface of the adjacent forward fillet to increase the wear-resistant properties of the peripheral part of the saw between the teeth.

5. A circular saw comprising a flat disc-like saw body having opposite sides perpendicular to the axis of rotation of the body, circumferentially spaced tooth-backing elements on the periphery of the saw body and projecting radially outwardly therefrom, each backing element having a generally L-shaped seat formed by circumferential and outwardly presented tooth-supporting surfaces, a carbide tooth having surfaces that define generally an L-shape and with said tooth surfaces on a backing element and with said abutting surfaces of the tooth and backing element being substantially perpendicular to said opposite sides of the saw body and being secured together by a bonding film interposed therebetween, said outwardly presented tooth-supporting surface being adjacent to the radially inner end of said circumferential tooth-supporting surface, said backing element immediately forwardly of said outwardly presented tooth-supporting surface extending radially inwardly of said tooth to provide a gullet, said front face being presented toward the adjacent forward backing element, the front face intersecting respectively the side faces of the tooth to form cutting edges which define opposed surfaces of revolution forming the kerf of the saw, and means forming equal and opposite acute shear face angles at each side of each tooth which substantially equalize the oppositely directed forces parallel to said axis rotation and which are imposed as shear forces on said bonding film during operation of the saw, said last-named means including surfaces on the tooth that interesect to form a V-shape at the front face of the tooth and with the V forming an obtuse angle and being centered midway between said two opposite sides of the body, said side faces lying entirely axially outwardly of said opposite side faces thereby to enable the cutting edges to be sharpened by grinding said side faces without grinding said body.

References Cited by the Examiner

UNITED STATES PATENTS

| | | | |
|---|---|---|---|
| 659,094 | 10/1911 | Oldham | 143—141 |
| 101,258 | 3/1870 | Goodman | 143—141 |
| 2,714,317 | 8/1955 | Drake | 143—133 |
| 2,965,143 | 12/1960 | Feldmann et al. | 143—133 |
| 3,176,732 | 4/1965 | Henderson | 143—133 |

DONALD R. SCHRAN, *Primary Examiner.*